Feb. 7, 1933. C. J. HUBBELL ET AL 1,896,313
MOLD
Filed Dec. 2, 1930
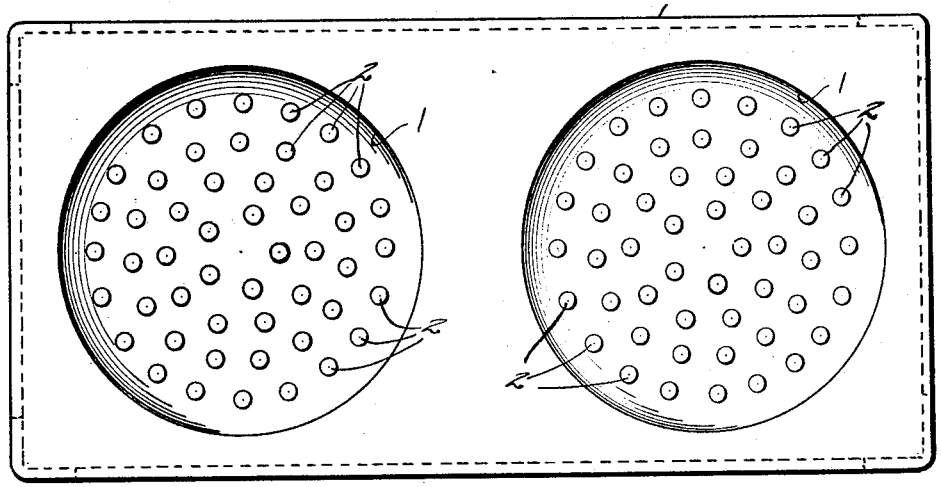
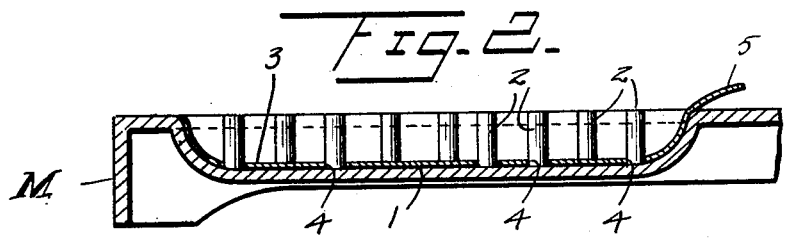
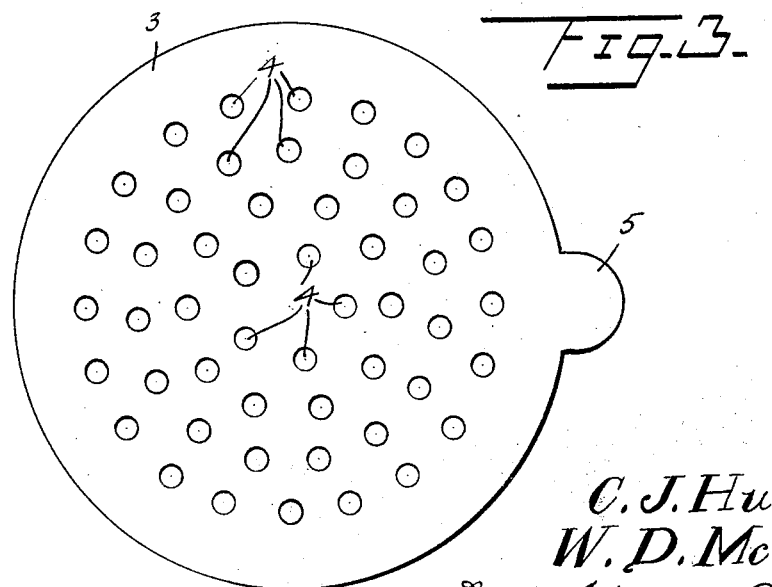
Inventors
C. J. Hubbell
W. D. McCauley
By Watson E. Coleman
Attorney Patented Feb. 7, 1933

1,896,313

UNITED STATES PATENT OFFICE

CLIFF J. HUBBELL, OF DEWEESE, AND WALLACE D. McCAULEY, OF LAWRENCE, NEBRASKA, ASSIGNORS OF ONE-THIRD TO ALBERT W. PERSON, OF CRETE, NEBRASKA

MOLD

Application filed December 2, 1930. Serial No. 499,604.

This invention relates to molds, and it is an object of the invention to provide a device of this kind particularly intended for use in the forming of meat patties and wherein provision is made to facilitate the removal of the molded patty.

The invention also has for an object to provide a device of this kind which operates to produce a perforated patty or cake, together with means to hold the patty or cake intact with the perforations undistorted during the time intervening between the molding of the cake or patty and its placement upon the griddle or kindred utensil for cooking.

The invention consists in the details of construction and in the combination and arrangement of the several parts of our mold whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawing, wherein:—

Figure 1 is a view in top plan of a mold constructed in accordance with an embodiment of our invention and with the removing sheets unapplied;

Figure 2 is a longitudinal sectional view taken through one end portion of the mold as illustrated in Figure 1, and on an enlarged scale, with a removing sheet applied;

Figure 3 is a view in top plan of a removing sheet constructed in accordance with an embodiment of our invention.

Our improved mold comprises the member M of desired configuration and which is herein shown as provided with two depressions 1 each of desired dimensions and capacity, said depressions constituting dies in which the cakes or patties are to be formed. Extending upwardly from the base wall of each of these depressions 1 are the upstanding pins 2 arranged in a plurality of annular series in concentric relation, said pins being of a length to terminate substantially flush with the upper surface of the member M proper. Before a patty or cake is formed or molded within a depression or die 1 a sheet 3 of waxed paper or kindred material is disposed over and in close contact with the bottom wall of the die or depression, said sheet or lamination being provided with the properly positioned openings 4 through which the pins 2 are projected.

At a desired point on its periphery the sheet or lamination 3 is provided with an outstanding tab 5 overlying the member M proper to one side of the depression or die 1. As the cake or patty is formed or molded within the die or depression 1 the patty or cake will be separated from the bottom wall of the die or depression by the sheet or lamination 3.

To remove the patty or cake it is only necessary to lift it out by taking hold of the tab 5. The sheet or lamination 3 will cling to the cake or patty until placed on the griddle and heated when it will separate of its own accord. This adherence of the sheet or lamination 3 is of particular importance and advantage as it serves to hold the patty intact with the perforations therethrough as created by the pins 2 undistorted during the period intervening between the molding of the patty or cake and its placement upon the heated griddle or kindred utensil.

From the foregoing description it is thought to be obvious that a mold constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

A molded article lifting and form retaining means comprising a flexible sheet provided with a plurality of apertures to engage about upstanding pins provided in a mold or form and adapted to be initially disposed in a mold and conform to the cavity of the mold and to receive on one face thereof an uncooked molded article, and a lifting tab formed with the sheet and providing means whereby the sheet and the article may be removed from the mold, said sheet maintaining the article in its molded form after removal of the article from the mold.

In testimony whereof we hereunto affix our signatures.

CLIFF J. HUBBELL.
WALLACE D. McCAULEY.